(12) United States Patent
Rosas Contreras et al.

(10) Patent No.: US 11,511,659 B2
(45) Date of Patent: Nov. 29, 2022

(54) DETACHABLE LIGHTING ASSEMBLY FOR A VEHICLE

(71) Applicant: Ford Global Technologies, LLC, Dearborn, MI (US)

(72) Inventors: Sebastian Rosas Contreras, Mexico City (MX); Alfredo Luna Contreras, Mexico City (MX); Ivan Carretero Jacinto, Ecatepec de Morelos (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/205,159

(22) Filed: Mar. 18, 2021

(65) Prior Publication Data

US 2022/0297593 A1 Sep. 22, 2022

(51) Int. Cl.
*B60Q 1/00* (2006.01)
*B60Q 1/02* (2006.01)
*B62D 27/06* (2006.01)

(52) U.S. Cl.
CPC .............. *B60Q 1/0088* (2013.01); *B60Q 1/02* (2013.01); *B62D 27/06* (2013.01)

(58) Field of Classification Search
CPC ......... B60Q 1/0088; B60Q 1/02; B62D 27/06
See application file for complete search history.

(56) References Cited

U.S. PATENT DOCUMENTS

| 4,286,309 | A | | 8/1981 | Rasinski | |
|---|---|---|---|---|---|
| 5,434,758 | A | | 7/1995 | Zeidler | |
| 6,623,151 | B2 | * | 9/2003 | Pederson | F21S 4/28 340/815.45 |
| 10,040,391 | B2 | * | 8/2018 | Thompson | H05B 45/10 |
| D895,873 | S | | 9/2020 | Yang | |
| 2006/0273121 | A1 | | 12/2006 | Thomas | |
| 2012/0063138 | A1 | * | 3/2012 | Leadford | F21V 15/015 362/249.02 |
| 2014/0198510 | A1 | * | 7/2014 | Law | B60Q 3/35 362/485 |
| 2016/0320015 | A1 | * | 11/2016 | Poole | F21V 3/062 |
| 2020/0404765 | A1 | * | 12/2020 | Rodinger | H05B 45/20 |

FOREIGN PATENT DOCUMENTS

| CN | 206439740 | 8/2017 |
|---|---|---|
| CN | 206918734 | 1/2018 |
| CN | 108662495 | 10/2018 |
| EP | 2589512 | 2/2015 |
| EP | 3021037 | 10/2018 |

* cited by examiner

*Primary Examiner* — Gerald J Sufleta, II
(74) *Attorney, Agent, or Firm* — Vichit Chea; Carlson, Gaskey & Olds, P.C.

(57) ABSTRACT

A vehicle assembly includes, among other things, a lighting assembly moveable back and forth between an attached position and a detached position. The lighting assembly spans from a first rail assembly of a vehicle to a second rail assembly of the vehicle when the lighting assembly is in the attached position. A vehicle lighting method includes, when a lighting assembly is in an attached position, engaging a first end portion of the lighting assembly with a first rail assembly of a vehicle, and when the lighting assembly is in the attached position, engaging an opposite, second end portion of the lighting assembly with a second rail assembly of the vehicle. The lighting assembly is configured to illuminate an area adjacent a vehicle when the lighting assembly is in the attached position.

18 Claims, 4 Drawing Sheets

DETACHABLE LIGHTING ASSEMBLY FOR A VEHICLE

TECHNICAL FIELD

This disclosure relates generally to a lighting assembly that can be attached to a vehicle and detached from the vehicle. When detached, the lighting assembly can be used as, for example, a handheld light.

BACKGROUND

Vehicles can include various lighting assemblies, such as headlights and taillights. Some vehicles can include other types of lighting assemblies, such as light bars. The lighting assemblies can be used to illuminate areas within or adjacent to the vehicle.

SUMMARY

A vehicle assembly according to an exemplary aspect of the present disclosure includes, among other things, a lighting assembly moveable back and forth between an attached position and a detached position. The lighting assembly spans from a first rail assembly of a vehicle to a second rail assembly of the vehicle when the lighting assembly is in the attached position.

Another example of the foregoing assembly includes a housing of the lighting assembly, a biased coupling of the lighting assembly, and a biasing device of the lighting assembly. The biasing device biases the housing and the biased coupling away from each other along a longitudinal axis of the lighting assembly.

In another example of any of the foregoing assemblies, when the lighting assembly is in the attached position, the biasing device biases the housing toward the first rail assembly and biases the biased coupling toward the second rail assembly.

Another example of any of the foregoing assemblies includes an electrical connector of the lighting assembly that is configured to engage an electrical connector of the first rail assembly when the lighting assembly is in the attached position.

In another example of any of the foregoing assemblies, the electrical connector of the lighting assembly is configured to engage an electrical connector that is separate from the first rail assembly when the lighting assembly is in the detached position.

In another example of any of the foregoing assemblies, the housing and the biased coupling are configured to retract and extend relative to each other when the lighting assembly is transitioned back and forth between the attached position and the detached position.

In another example of any of the foregoing assemblies, a longitudinal length of the lighting assembly in the attached position is less than the longitudinal length of the lighting assembly in the detached position.

In another example of any of the foregoing assemblies, when the lighting assembly is in the attached position, a first end portion of the lighting assembly is received within a first recess of the first rail assembly and an opposite, second end portion of the lighting assembly is received within a second recess of the second rail assembly.

In another example of any of the foregoing assemblies, a forward bracket of the first rail assembly provides the first recess, and a forward bracket of the second rail assembly provides the second recess.

Another example of any of the foregoing assemblies includes a biasing device that, when the lighting assembly is in the attached position, biases the lighting assembly laterally outward toward the first and second rail assemblies.

In another example of any of the foregoing assemblies, the first rail assembly further comprises a passenger side rail supported by the forward bracket of the first rail assembly. The second rail assembly further comprises a driver side rail supported by the forward bracket of the second rail assembly.

In another example of any of the foregoing assemblies, the lighting assembly is powered through at least the first rail assembly when the lighting assembly is in the attached position.

In another example of any of the foregoing assemblies, the lighting assembly is configured to illuminate at least an area that is forward of the vehicle when the lighting assembly is in the attached position.

A vehicle lighting method according to another exemplary aspect of the present disclosure includes, when a lighting assembly is in an attached position, engaging a first end portion of the lighting assembly with a first rail assembly of a vehicle, and when the lighting assembly is in the attached position, engaging an opposite, second end portion of the lighting assembly with a second rail assembly of the vehicle. The lighting assembly is configured to illuminate an area adjacent a vehicle when the lighting assembly is in the attached position.

Another example of the foregoing vehicle lighting method includes, compressing the lighting assembly along a longitudinal axis of the lighting assembly to shorten a length of the lighting assembly along the longitudinal axis, and, during the compressing, transitioning the lighting assembly from the attached position to a detached position.

Another example of any of the foregoing vehicle lighting methods includes, when the lighting assembly is in the attached position, powering the lighting assembly through the first rail assembly. An electrical connector of the lighting assembly is electrically coupled to an electrical connector of the first rail assembly when the lighting assembly is in the attached position. When the lighting assembly is in the detached position, the method includes powering the lighting assembly using at least one rechargeable battery.

Another example of any of the foregoing vehicle lighting methods includes, when the lightning assembly is in the detached position, powering the lighting assembly through at least one rechargeable battery which is inside the lightning assembly. Power from the vehicle can recharge the battery of the lightning assembly when the lightning assembly is in the attached position.

Another example of any of the foregoing vehicle lighting methods includes, using the lighting assembly as a handheld light when the lighting assembly is in the detached position and, transitioning a switch of the lighting assembly to turn on or turn off one or more lights of the lightning assembly when the lightning assembly is in the detached position.

Another example of any of the foregoing vehicle lightning methods includes, a switch to turn on or turn off one or more of the lights.

Another example of any of the foregoing vehicle lighting methods includes using the lighting assembly as a power bank when the lighting assembly is in the detached position.

Another example of the foregoing vehicle lighting method includes biasing the lighting assembly toward an extended position to secure the lighting assembly in the attached position.

Another example of the foregoing vehicle lighting methods includes engaging the first end portion of the lighting assembly comprises receiving the first end portion within a recess of the first rail assembly. Engaging the second end portion of the lighting assembly comprises receiving the second end portion within a recess of the second rail assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a lighting assembly that can be attached to a vehicle. As needed, a user can detach the lighting assembly from the vehicle and use the lighting assembly as a handheld light. In the detached position, the lighting assembly could also be used as a power bank.

Figure 1:
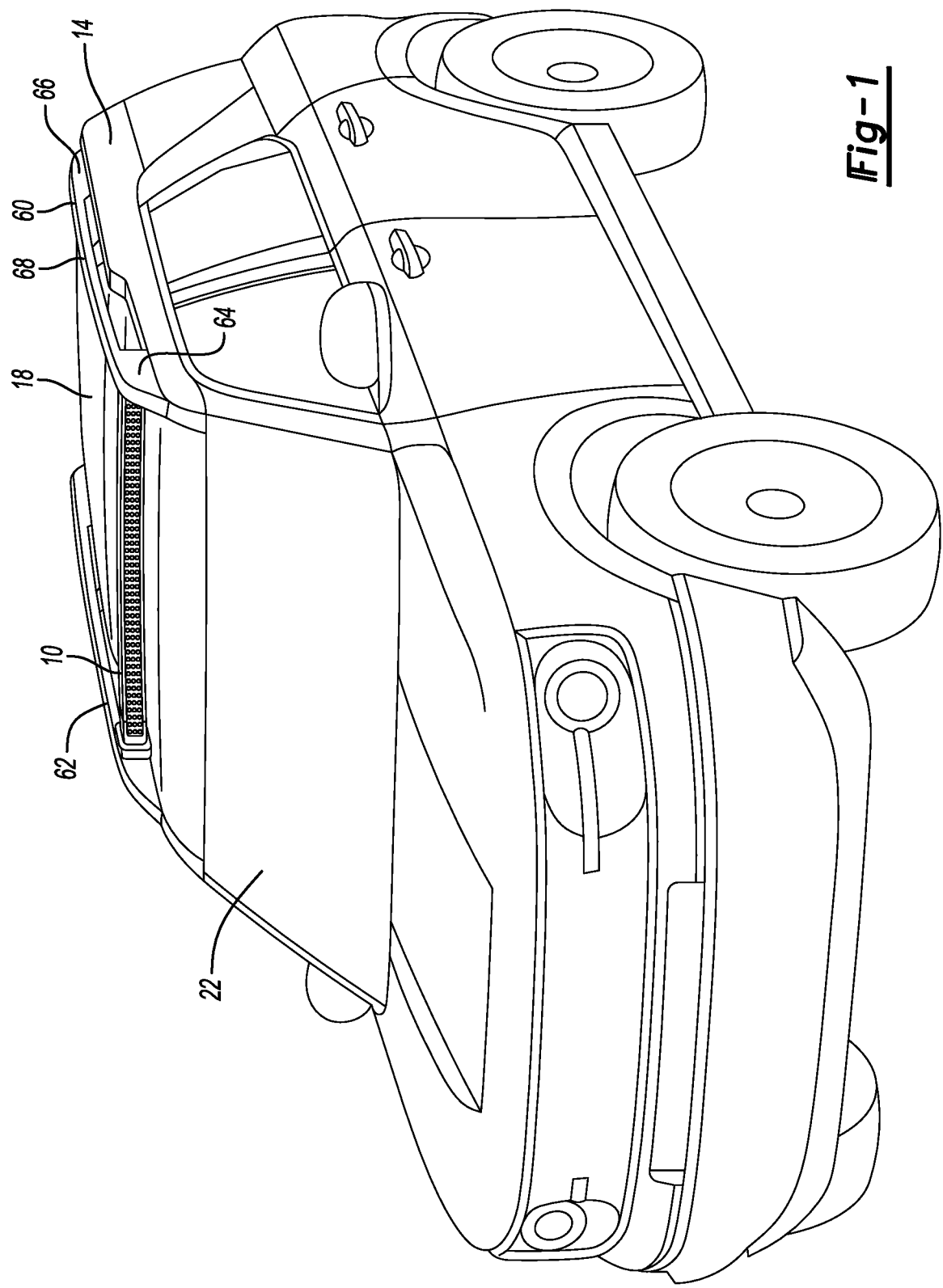
FIG. 1 illustrates a perspective view of a lighting assembly according to an exemplary embodiment of the present disclosure when the lighting assembly is secured to a vehicle in an attached position.

With reference to FIG. 1, a lighting assembly 10 is attached to a vehicle 14 when the lighting assembly 10 is in an attached position.

In the exemplary embodiment, the lighting assembly 10 is a light bar. When in the attached position, the lighting assembly 10 is adjacent a top side 18 of the vehicle 14 and is vertically above a windshield 22 of the vehicle 14. In the attached position, the lighting assembly 10 can be used to illuminate areas in front of the vehicle 14 when, for example, the vehicle 14 is off-roading.

Figure 2:
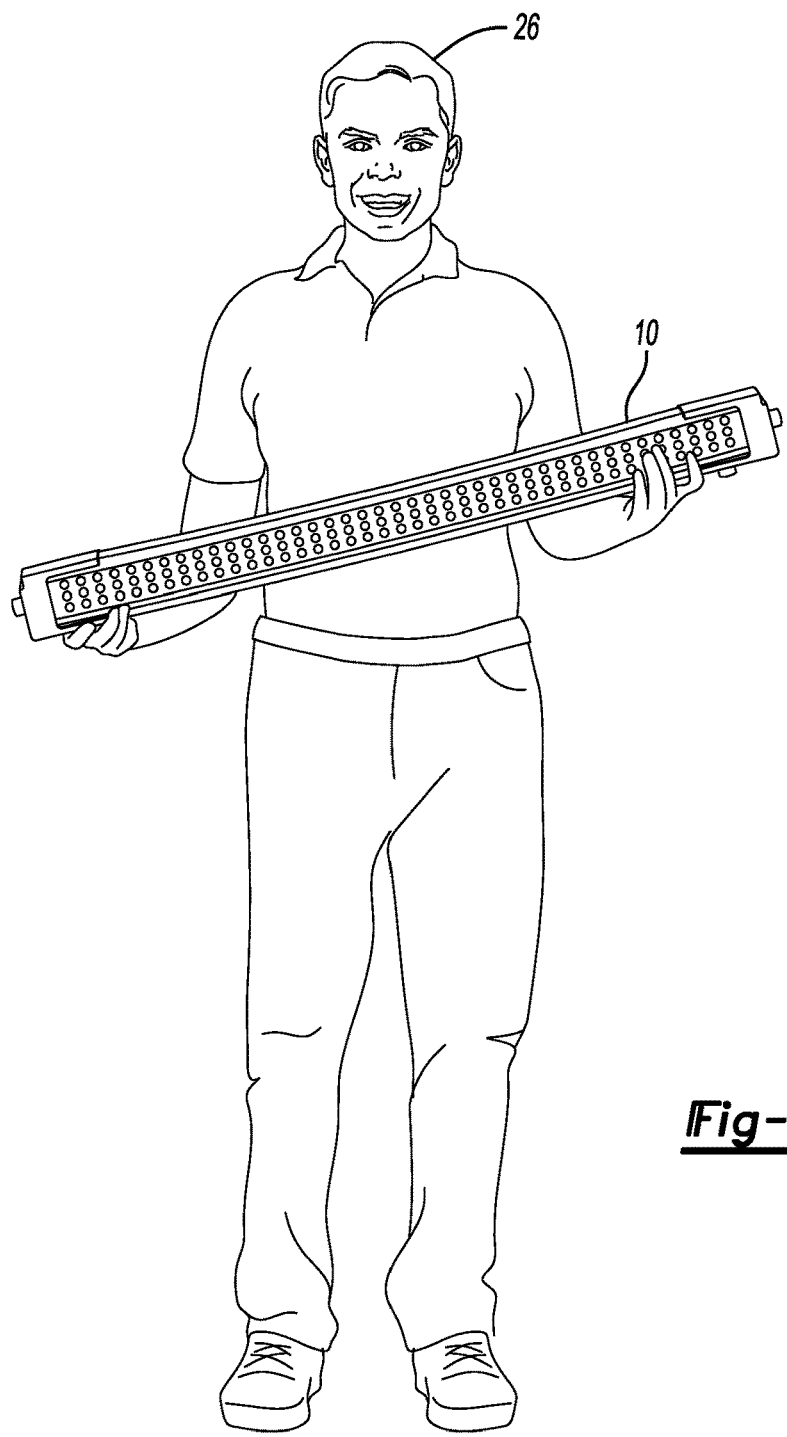
FIG. 2 illustrates a user holding the lighting assembly of FIG. 1 when the lighting assembly is in a detached position.
Figure 3:
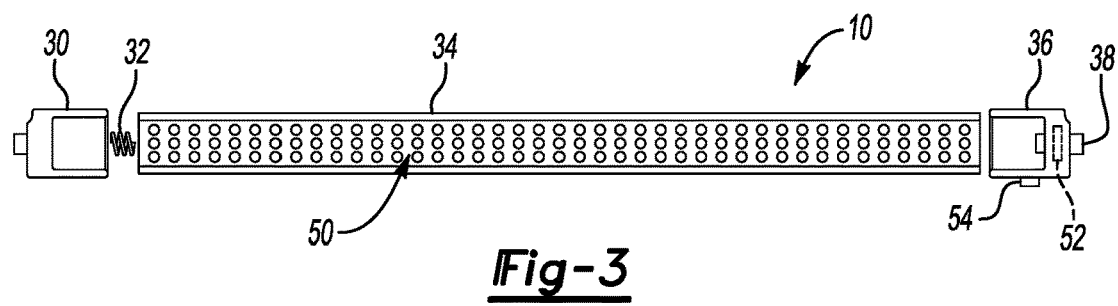
FIG. 3 illustrates an expanded view of the lighting assembly of FIG. 1.
Figure 4:
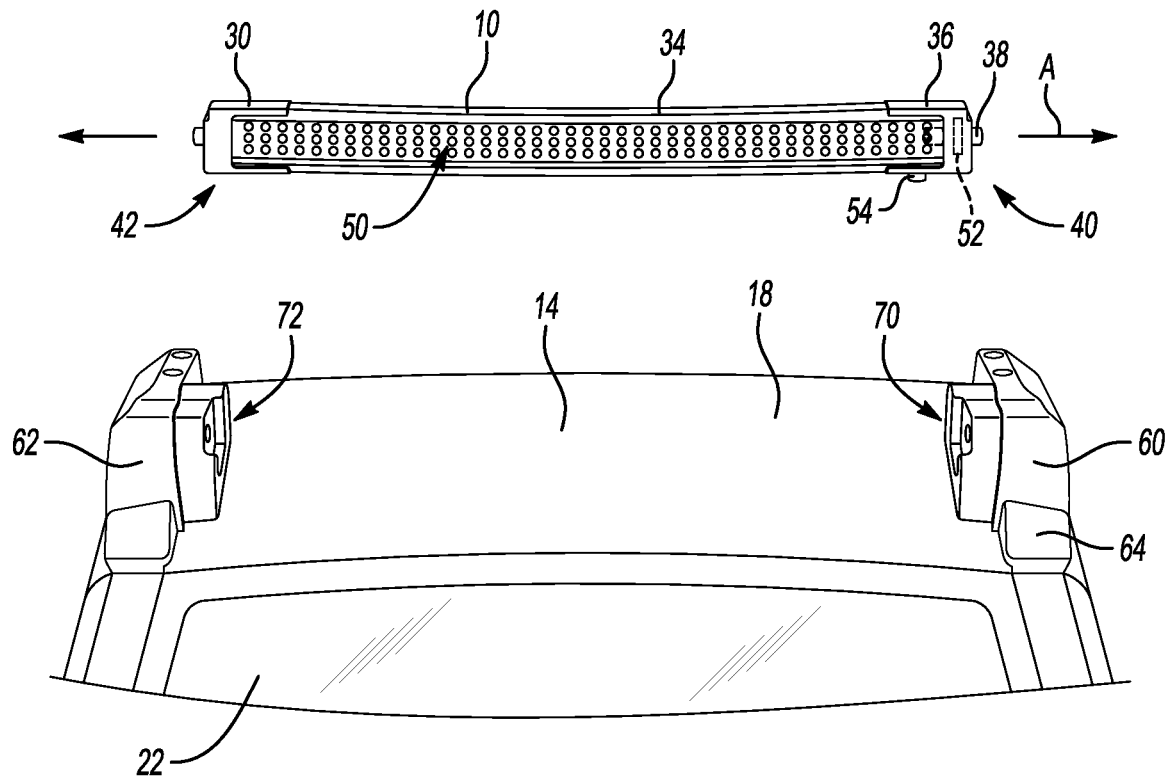
FIG. 4 illustrates a front view of a portion of the vehicle in FIG. 1 along with a front view of the lighting assembly in a detached position.
Figure 5:
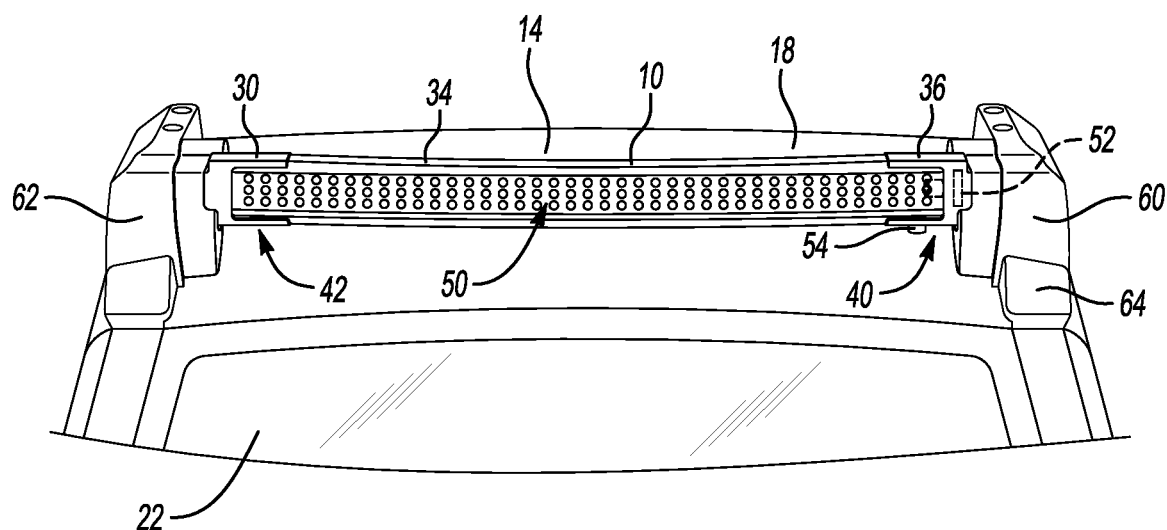
FIG. 5 illustrates a front view of a portion of the vehicle of FIG. 1 when the lighting assembly is in the attached position.
Figure 6:
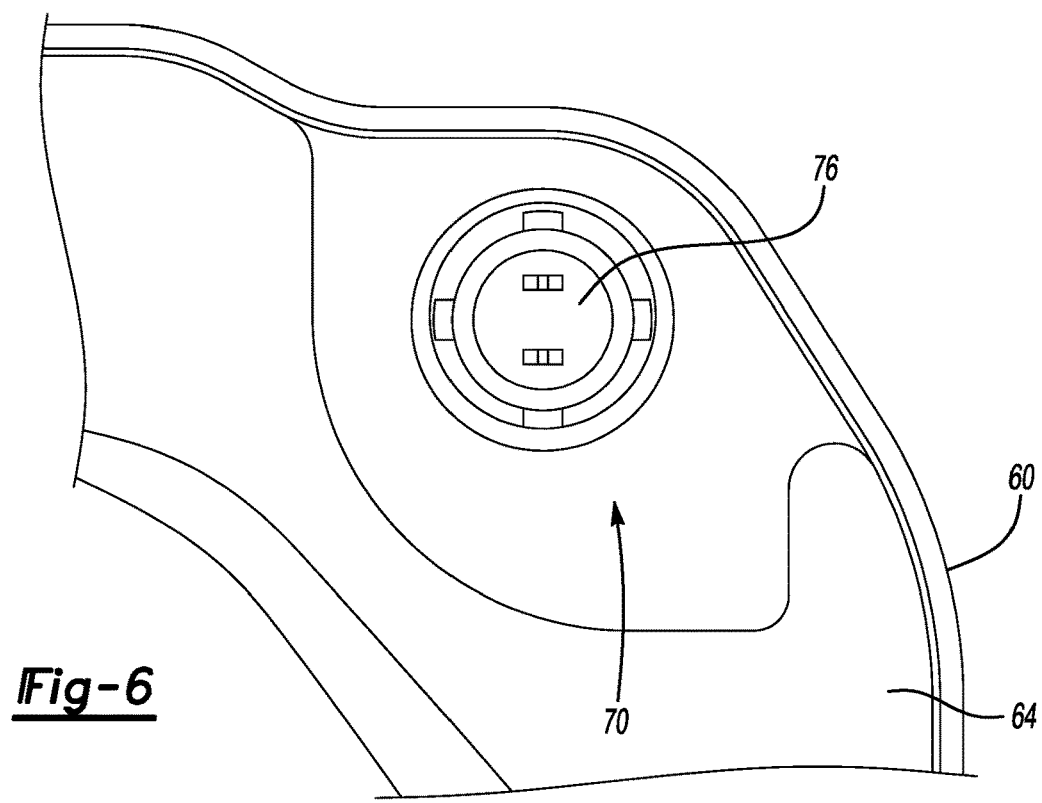
FIG. 6 illustrates a vehicle connector that operably couples the vehicle to the lighting assembly when the lighting assembly is in the attached position.
Figure 7:
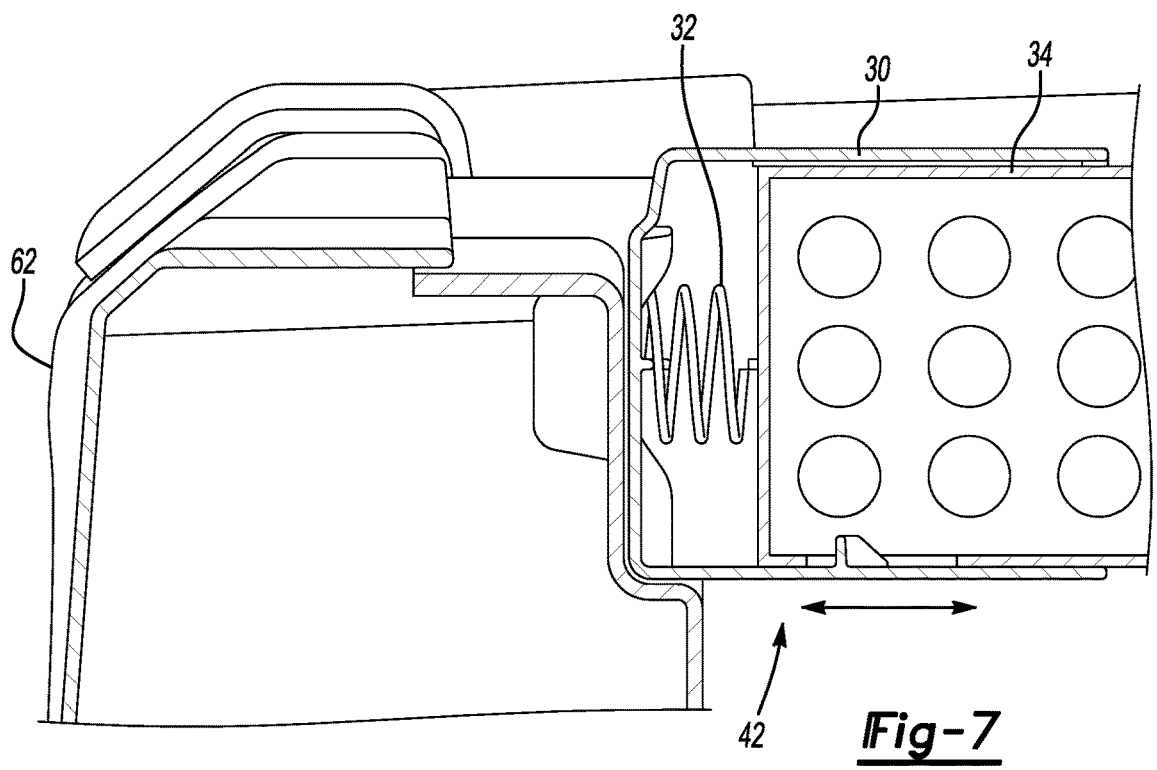
FIG. 7 illustrates a close-up, section view of an end portion of the lighting assembly and a rack assembly when the lighting assembly is in an attached position.

The lighting assembly 10 can be moved from the attached position of FIG. 1 to a detached position as shown in FIG. 2. When in the detached position, a user 26 can carry the lighting assembly 10 and use the lighting assembly 10 as a handheld light, for example. The user 26 could also use the lighting assembly 10 as a power bank to, for example, recharge a smartphone.

The user 26 can move the lighting assembly 10 back and forth between the attached position of FIG. 1 and the detached position of FIG. 2.

With reference to FIGS. 3 to 7 and continuing reference to FIGS. 1 and 2, the lighting assembly 10, in the exemplary embodiment, includes a biased coupling 30, a biasing member 32, a housing 34, a housing coupling 36, and a connector 38.

The lighting assembly 10 extends along a longitudinal axis A from a first end portion 40 to an opposite, second end portion 42. The housing coupling 36 is disposed at the first end portion 40. The biased coupling 30 is disposed at the opposite, second end portion 42.

The lighting assembly 10 further includes a plurality of individual lights 50, a battery 52, and a switch 54. The lights 50, in the exemplary embodiment, are light emitting diodes (LEDs) held within the housing 34. The lights 50 can emit light when powered by the battery 52. Notably, the battery 52 can power the lights 50 when the lighting assembly 10 is in the detached position of FIG. 4. This facilitates use of the lighting assembly 10 as a handheld light. A user can transition the switch 54 to turn one or more of the lights 50 on and off. When the lighting assembly 10 is used as a power bank, the battery 52 can be the power source of the power bank. The battery 52 can be recharged when the lighting assembly is back in the attached position.

When the lighting assembly 10 is in the attached position, the lighting assembly 10 spans from a first rail assembly 60 of the vehicle 14 to an opposite, second rail assembly 62 of the vehicle 14. In this example, the first rail assembly 60 is a driver side rail assembly of the vehicle 14, and the second rail assembly 62 is a passenger side rail assembly of the vehicle 14. When in the attached position, the lights 50 of the lighting assembly 10 can be turned on to illuminate at least an area that is in front of the vehicle 14.

The first rail assembly 60 includes a forward bracket 64, a rear bracket 66, and a rail 68 extending from the forward bracket 64 to the rear bracket 66. The second rail assembly 62 is configured similarly to the first rail assembly 60. That is, the second rail assembly 62 includes a respective forward bracket, rear bracket and rail.

The forward bracket 64 and the rear bracket 66 secure the rail 68 of the first rail assembly 60 to the vehicle 14. The rail 68, together with a corresponding rail of the second rail assembly 62, can be used to support cargo and other items.

The first rail assembly 60 and the second rail assembly 62 support the lighting assembly 10 in the attached position. In particular, when the lighting assembly 10 is in the attached position, the housing coupling 36 is received within a recess 70 of the first rail assembly 60 to engage the first end portion 40 of the lighting assembly 10 with the first rail assembly 60. The biased coupling 30 is received within a recess 72 of the second rail assembly 62 to engage the second end portion 42 of the lighting assembly 10 with the second rail assembly 62. The forward bracket 64 of the first rail assembly provides the recess 70 of the first rail assembly 60. A forward bracket of the second rail assembly 62 provides the second recess 72. Notably, the connector 38 of the lighting assembly 10 connects to a vehicle connector 76 within the first rail assembly 60 when the housing coupling 36 is received within the recess 70. The vehicle connector 76 can include a 110 Volts of AC and 400-watt outlet. A pigtail of the vehicle 14 can extend from a power source in the vehicle 14 to the vehicle connector 76.

When the lighting assembly 10 is in the attached position, the battery 52 and the switch 54 may not be directly utilized by a user to power and control the lights 50. Instead, when the lighting assembly 10 is in the attached position, the connector 38 can engage the vehicle connector 76 of the vehicle 14. When the connector 38 engages the vehicle connector 76, the individual lights 50 can be powered through the vehicle 14. A 12-Volt accessory battery of the vehicle 14 can provide power to the lighting assembly 10, for example.

The battery 52 of the lighting assembly 10 can be a rechargeable battery. Power from the vehicle 14 can, in some examples, recharge the battery 52 of the lighting assembly 10 when the lighting assembly 10 is in the attached position.

Coupling the connector 38 of the lighting assembly 10 to the vehicle connector 76 can also permit the vehicle 14 to control the lighting assembly 10. Control can include turning one or more of the lights 50 on or off. Control could instead or additionally include changing an intensity or color of the light emitted from the lights 50. In some examples, a user operating the vehicle 14 can activate switches within the vehicle 14 to control the lights 50 when the lighting assembly 10 is in the attached position. Notably, when the lighting assembly 10 is in the detached position, the vehicle connector 76 can be engaged to power a device other than the lighting assembly 10, such as to recharge a smartphone or to power a speaker at a campsite.

The exemplary biased coupling 30 fits over part of the housing 34 such that the biased coupling 30 and the housing 34 overlap along the axis A. The biasing member 32, here a coil spring, is positioned between a portion of the housing 34 and a portion of the biased coupling 30. The biasing member 32 is configured to bias the biased coupling 30 away from the housing 34 along the axis A. When the lighting assembly 10 is in the attached position, the biasing member 32 biases the biased coupling 30 axially away from the housing 34 to help hold the lighting assembly 10 in the attached position. The biasing member 32 can be slightly compressed when the lighting assembly 10 is in the attached position such that a longitudinal length of the lighting assembly 10 in the attached position is less than the longitudinal length of the lighting assembly in the detached position. Configuring the lighting assembly 10 in this way can facilitate holding the lighting assembly 10 firmly in the attached position.

A longitudinal length of the lighting assembly 10 can be reduced by applying a force to the lighting assembly 10 that compresses the biasing member 32 and moves the housing 34 to a more retracted position within the biased coupling 30. When the force is removed, the biasing force of the biasing member 32 tends drive the biased coupling 30 and the housing 34 away from each other, which can increase an overall longitudinal length of the lighting assembly 10.

Thus, to move the move the lighting assembly 10 from the attached position to the detached position, the user can move the biased coupling 30 along the axis A toward the housing 34, which compresses the biasing member 32 and shortens an overall length of the lighting assembly 10 and can withdraw the biased coupling 30 out of the recess 72 of the second rail assembly 62. The user can then tip the lighting assembly 10 and withdraw the housing coupling 36 from the recess 70 within the first rail assembly 60.

When the lighting assembly 10 is in the detached position, the user 26 can use the light as a handheld light that illuminates a hiking trial, for example. The lights 50 can be powered by the battery 52. Alternatively, when the lighting assembly 10 is in the detached position, the connector 38 of the lighting assembly 10 could be coupled to an electrical connector that is not part of the vehicle 14. For example, the user could connect the connector 38 of the lighting assembly 10 to an extension cord that powers the lights 50 with grid power. The user could then hang the lighting assembly 10 to illuminate a campsite area, for example.

Features of some of the disclosed examples include a lighting assembly that can be mounted or attached to a vehicle in a substantially a single step. That is, the electrical connections can be made as the lighting assembly is attached to the vehicle. The attachment to the vehicle can be made without heavily stylized brackets, exposed wiring, or a requirement to drill.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
a lighting assembly moveable back and forth between an attached position and a detached position, the lighting assembly spanning from a first rail assembly of a vehicle to a second rail assembly of the vehicle when the lighting assembly is in the attached position, wherein the lighting assembly is configured to illuminate at least an area that is forward of the vehicle when the lighting assembly is in the attached position, wherein the lighting assembly is vertically above a windshield of the vehicle when the lighting assembly is in the attached position.

2. The vehicle assembly of claim 1, further comprising a housing of the lighting assembly, a biased coupling of the lighting assembly, and a biasing device of the lighting assembly, the biasing device biasing the housing and the biased coupling away from each other along a longitudinal axis of the lighting assembly.

3. The vehicle assembly of claim 2, wherein, when the lighting assembly is in the attached position, the biasing device biases the housing toward the first rail assembly and biases the biased coupling toward the second rail assembly.

4. The vehicle assembly of claim 3, further comprising an electrical connector of the lighting assembly that is configured to engage an electrical connector of the first rail assembly when the lighting assembly is in the attached position.

5. The vehicle assembly of claim 4, wherein the electrical connector of the lighting assembly is configured to engage an electrical connector that is separate from the first rail assembly when the lighting assembly is in the detached position.

6. The vehicle assembly of claim 3, wherein the housing and the biased coupling are configured to retract and extend relative to each other when the lighting assembly is transitioned back and forth between the attached position and the detached position.

7. The vehicle assembly of claim 1, wherein, when the lighting assembly is in the attached position, a first end portion of the lighting assembly is received within a first recess of the first rail assembly and an opposite, second end portion of the lighting assembly is received within a second recess of the second rail assembly.

8. The vehicle assembly of claim 7, wherein a forward bracket of the first rail assembly provides the first recess, and a forward bracket of the second rail assembly provides the second recess.

9. The vehicle assembly of claim 8, further comprising a biasing device that, when the lighting assembly is in the attached position, biases the lighting assembly laterally outward toward the first and second rail assemblies.

10. The vehicle assembly of claim 9, wherein the first rail assembly further comprises a passenger side rail supported by the forward bracket of the first rail assembly, wherein the second rail assembly further comprises a driver side rail supported by the forward bracket of the second rail assembly.

11. The vehicle assembly of claim 9, wherein the lighting assembly is powered through at least the first rail assembly when the lighting assembly is in the attached position.

12. A vehicle assembly, comprising:
a lighting assembly moveable back and forth between an attached position and a detached position, the lighting assembly spanning from a first rail assembly of a vehicle to a second rail assembly of the vehicle when the lighting assembly is in the attached position, wherein a longitudinal length of the lighting assembly in the attached position is less than the longitudinal length of the lighting assembly in the detached position.

13. A vehicle lighting method, comprising:
when a lighting assembly is in an attached position, engaging a first end portion of the lighting assembly with a first rail assembly of a vehicle;
when the lighting assembly is in the attached position, engaging an opposite, second end portion of the lighting assembly with a second rail assembly of the vehicle, the lighting assembly configured to illuminate an area adjacent a vehicle when the lighting assembly is in the attached position;
compressing the lighting assembly along a longitudinal axis of the lighting assembly to shorten a length of the lighting assembly along the longitudinal axis; and during the compressing, transitioning the lighting assembly from the attached position to a detached position.

14. The vehicle light mounting method of claim 13, further comprising, when the lighting assembly is in the attached position, powering the lighting assembly through the first rail assembly, wherein an electrical connector of the lighting assembly is electrically coupled to an electrical connector of the first rail assembly when the lighting assembly is in the attached position; and
when the lighting assembly is in the detached position, powering the lighting assembly using at least one rechargeable battery.

15. The vehicle light mounting method of claim 13, further comprising: using the lighting assembly as a hand-held lighting assembly when the lighting assembly is in the detached position and, transitioning a switch of the lighting assembly to turn on or turn off one or more lights of the lightning assembly when the lightning assembly is in the detached position.

16. The vehicle lighting mounting method of claim 13, further comprising: using the lighting assembly as a power bank when the lighting assembly is in the detached position.

17. The vehicle light mounting method of claim 13, further comprising biasing the lighting assembly toward an extended position to secure the lighting assembly in the attached position.

18. The vehicle light mounting method of claim 13, wherein engaging the first end portion of the lighting assembly comprises receiving the first end portion within a recess of the first rail assembly, wherein engaging the second end portion of the lighting assembly comprises receiving the second end portion within a recess of the second rail assembly.

* * * * *

UNITED STATES PATENT AND TRADEMARK OFFICE
CERTIFICATE OF CORRECTION

| | |
|---|---|
| PATENT NO. | : 11,511,659 B2 |
| APPLICATION NO. | : 17/205159 |
| DATED | : November 29, 2022 |
| INVENTOR(S) | : Sebastian Rosas Contreras, Alfredo Luna Contreras and Ivan Carretero Jacinto |

It is certified that error appears in the above-identified patent and that said Letters Patent is hereby corrected as shown below:

In the Claims

In Claim 13, Column 7, Line 22; replace "A vehicle lighting method" with --A vehicle light mounting method--

Signed and Sealed this
Third Day of January, 2023

Katherine Kelly Vidal
*Director of the United States Patent and Trademark Office*